June 7, 1955

J. O. REED 2,710,260

METHOD FOR THE CONVEYING AND HEAT
PROCESSING OF CANNED MATERIALS

Filed June 19, 1951

INVENTOR
Jesse O. Reed

BY Leon Simon

ATTORNEY

June 7, 1955
J. O. REED
2,710,260
METHOD FOR THE CONVEYING AND HEAT
PROCESSING OF CANNED MATERIALS
Filed June 19, 1951
2 Sheets-Sheet 2
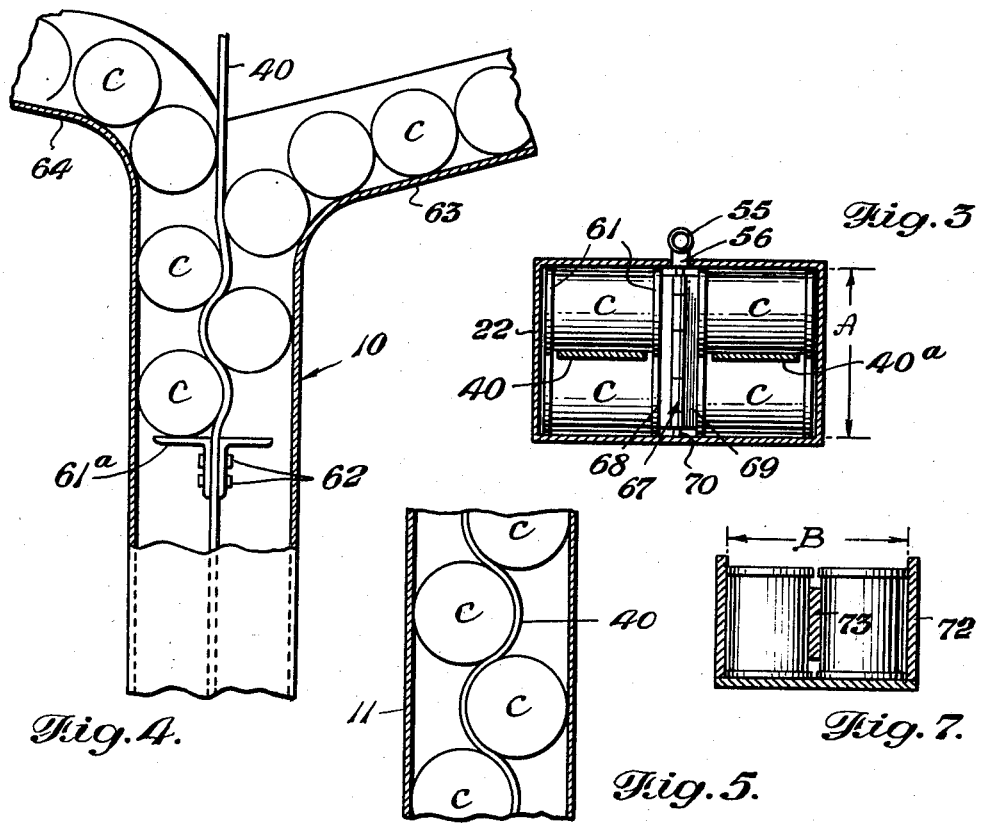
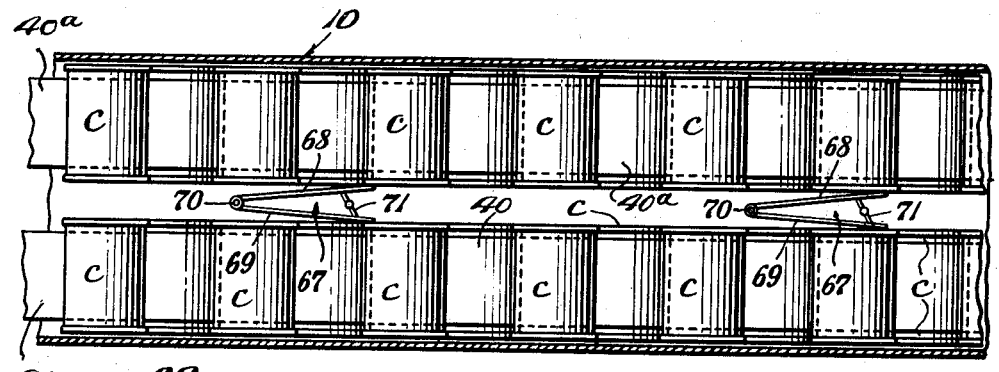
INVENTOR.
Jesse O. Reed
BY Leon Simon
ATTORNEY United States Patent Office 2,710,260
Patented June 7, 1955

2,710,260

METHOD FOR THE CONVEYING AND HEAT PROCESSING OF CANNED MATERIALS

Jesse O. Reed, Washington, D. C.

Application June 19, 1951, Serial No. 232,334

4 Claims. (Cl. 99—214)

The present invention relates to a novel method and apparatus for conveying and heat processing canned materials.

More particularly the present invention relates to a novel apparatus which is capable of rapidly conveying loaded cans so that these cans can be quickly and efficiently processed for the preservation of the contents thereof.

The present invention more particularly relates also to a novel process for subjecting cans in a continuous manner to gradually increasing pressure and heat for maintaining these cans at a given pressure and heat and for thereafter gradually releasing such pressure while cooling the cans and contents thereof.

The usual method of processing food products in sealed cans is to subject the external surface of the filled can or container to a heating medium for cooking and sterilizing its contents and to a cooling medium for removing the heat therefrom. Steam under pressure is usually employed as the heating medium and cold water as the coolant. Usually a plurality of cans in crates or perforated containers are placed in a closed retort and steam is introduuced as the heating medium. The retort is maintained under a regulated pressure for the period of time required for obtaining a satisfactory product. Upon the termination of the heating operation cold water is then introduced into the retort to cool the contents and prevent overcooking. It has been recognized, however, that quick cooling of the cans and contents without maintaining the pressure results in distortion and damage to the can and it has been the practice to introduce compressed air along with the cooling water in order to maintain the pressure until the cans are cooled. Usually these operations are controlled manually. In a process and apparatus just described it is difficult to insure that all of the cans receive the same heat treatment since the time of processing must be continued until the entire contents of the can is heated to the required temperature. This, of course, results in perhaps over-heating the material closest to the can wall. The necessary heating of the large steel retorts also wastes considerable heat.

It has been suggested that cans during processing be subjected to agitation or rolling. However, in such cases an involved and cumbersome apparatus has necessarily been employed.

It is a general object of the present invention therefore to provide a simple, efficient method for the processing of cans under pressure and suitable heating conditions for cooking and sterilization of contents while continuously moving the cans in a liquid path.

A second general object of the present invention is to provide a novel apparatus for the conveying and processing of cans filled with food or the like which will be economical to operate and which will provide for rotation and agitation of can contents during processing.

A third general object of the present invention is to provide a novel conveyor system for cans or the like wherein motive power for moving the cans is provided by a continuous flexible belt and wherein the cans themselves furnish rollers or bearings for the support of the moving belt.

Other objects and advantages of the present invention will become apparent from the subsequent description and figures of the drawing wherein:

Fig. 1 is a diagrammatic illustration of the apparatus of the present invention for conveying and processing cans or the like;

Fig. 2 is a diagrammatic illustration of a portion of the apparatus of Fig. 1 with a modified vertical conveying portion affixed thereto;

Fig. 3 is a section taken generally along the line 3—3 of Fig. 1;

Fig. 4 is an enlarged, partly sectioned detail illustrating the means for initiating movement of cans through the conveyor conduit;

Fig. 5 is a section of the conveyor conduit illustrating the disposition of the belt therein when larger sized cans are conveyed;

Fig. 6 is a horizontal section of a portion of one of the horizontal tubes forming a part of the conveyor conduit illustrating the arrangement of liquid baffles therein;

Fig. 7 is a modification illustrating a conveyor trough wherein a central belt is utilized for conveying cans rotating along a vertical axis; and Fig. 8 is a diagrammatic view illustrating an application of the present invention to the movement of cylindrical objects on a generally horizontal support.

Figures 1, 2:
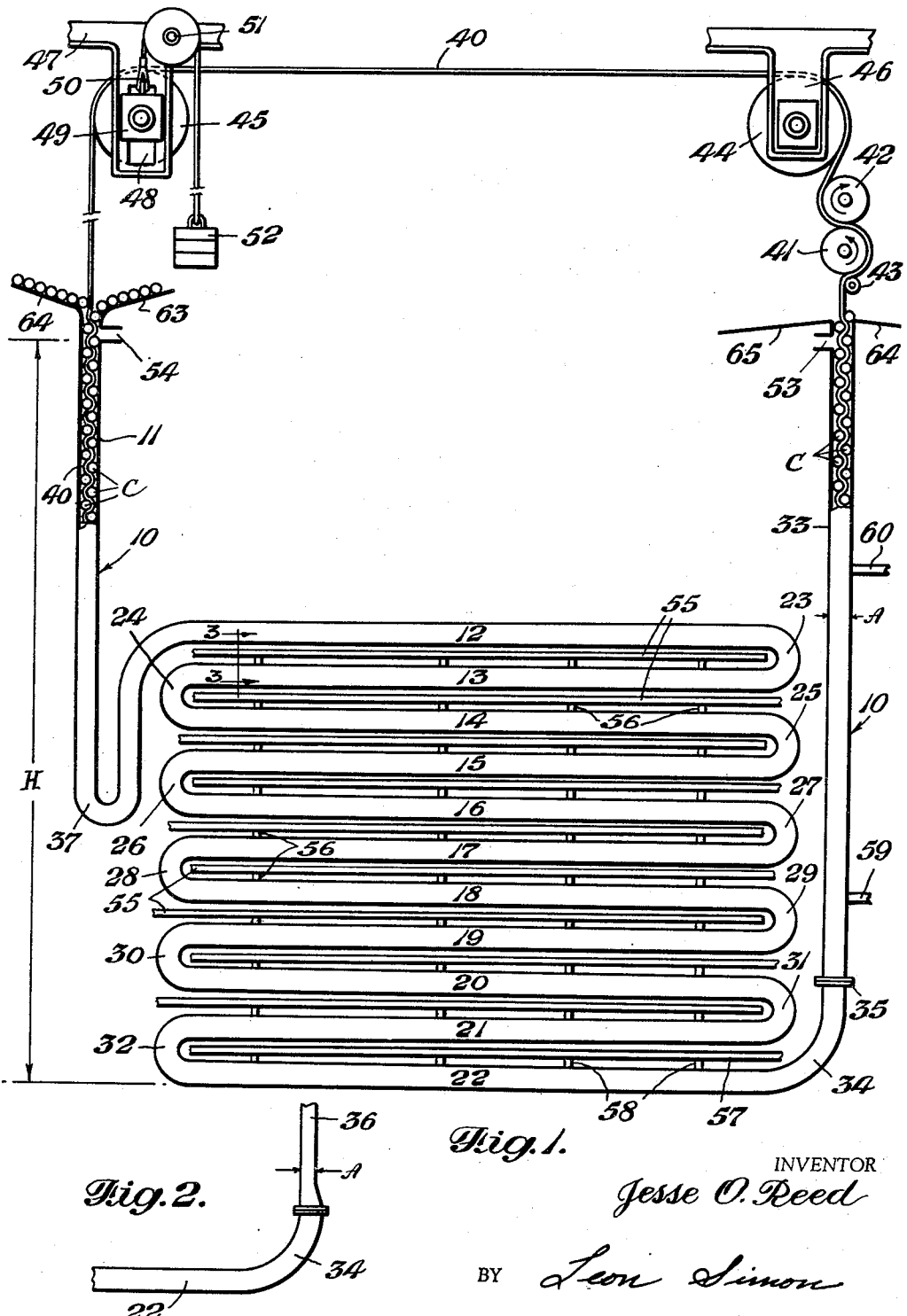

Referring to the figures of the drawing and particularly Figure 1 thereof a conduit for the conveying of cans is indicated generally at 10. The conduit 10 includes a downwardly extending portion 11, a generally horizontally extending portion constituted by the straight tubes 12, 13, 14, 15, 16, 17, 18, 19, 20, 21 and 22 connected respectively by the elbows 23, 24, 25, 26, 27, 28, 29, 30, 31 and 32. The conduit 10 also includes a generally vertical upwardly extending portion 33 connected to the horizontal tube 22 by the elbow 34. The elbow 34 and the portion 33 may be joined together by the separable joint 35 so that a vertical section 36 having a small transverse dimension may be used for smaller cans as will be hereinafter set forth in detail. The horizontal tube 12 is connected to the vertical section 11 by the trap section 37 so as to prevent passage of steam up through the vertical portion 11.

Threaded through the conduit 10 are flexible belts 40 and 40a which may be made of a suitable metal or composition such as cloth impregnated with plastics or any other material which will remain unaffected and flexible when exposed to an aqueous medium at temperatures of 250 to 260° F. The belts 40 and 40a are trained about and between, and driven by a pair of rollers 41 and 42 which may be driven by suitable gearing (not shown) from a suitable power means such as an electric motor (not shown). An idler 43 insures firm contact of the belts with the drive roller 41 and a pair of supporting rollers 44 and 45 serve to support the upper end of the belts 40 and 40a. The roller 44 is supported for rotation in a bearing member 46 and the roller 45 is slidably supported for rotation in the bearing member 47. As shown in Fig. 1 the slot 48 permits upward and downward movement of the roller 45 which is carried by a block 49. Fastened to the block 49 is a cable 50 trained over the pulley 51 and fastened to a weight 52. The weight 52 thus serves to tension the belts 40 and 40a and by adding and subtracting weights to the weight 52 the belt may be subjected to a greater or lesser tension.

The conduit 10 is normally filled with water to the level of the cold water outlet 53 and the hot water outlet 54.

The horizontal tubes 12, 13, 14, 15, 16, 17, 18, 19, 20 and 21 are provided with heating means such as steam pipe headers illustrated at 55 each provided with a plurality of inlet pipes 56 opening to the headers 55 and the respective horizontal tube. The horizontal tube 22 is provided with a similar header 57 and inlet pipes 58 for feeding cold water into this horizontal tube. Additional cold water inlets feed cold water into the vertical portion 33 and are indicated at 59 and 60.

As best shown in Fig. 3 each of the belts 40 and 40a is narrower than the length of the cans C and therefore fits between the end flanges 61 thereof. The inside transverse dimension A (vertical dimension of the horizontal tubes) of the conduit 10 is less than the diameter of two of the cans C so that the cans assume a staggered relationship as best shown in Figs. 4 and 5. Further the belts 40 and 40a conform in part to the circumference of the cans C and assume a sinuous shape as shown. When larger cans are used then the cans assume a more deeply staggered relation, as best shown in Fig. 5.

A temporary support 61a (Fig. 4), which may be formed of angle bars bolted to the belts as by bolts 62, serves to support the cans C when the conduit 10 is being initially loaded from the tables 63 and 64. This support 61a is removed when the first cans reach the end of the conduit 10 and are discharged to the tables 64 and 65 and thereafter the cans will follow one another in a continuous fashion during processing.

As shown in Fig. 6, spring baffles 67 are provided to retard flow of heating water in the horizontal tubes 12 to 21, inclusive. The baffles 67 fit between the belts 40 and 40a. The baffles 67 include a pair of flexible plates 68 and 69 pivoted at 70 and forced apart by the rotatable member 71.

In Fig. 7 an open trough conveyor is shown wherein cans C are conveyed in a trough 72 which takes the place of conduit 10, by a belt 73. In this modification the belt 73 will be similarly driven and assume a similar shape to the belts 40 and 40a. The cans C however will be rotated about a vertical axis. In this modification the transverse B dimension of the trough 72 is also less than the diameter of two cans. This type of conveyor may be used for the conveying of cans for various general purposes.

In Fig. 8 a modification is shown for the purpose of conveying rotatable objects, such as drums or the like on a generally horizontal surface. This surface may be, of course, inclined upwardly and the drums rolled upwardly. In this modification and device a belt 75 is shown which is of a flexible nature and generally similar to the belt 40. The belt is trained over pulleys 76, 77, 78 and 79. One or more of these pulleys may be driven for the purpose of imparting motion to the belt 75. Further, one or more of these pulleys may be provided with a sliding bearing and a weight, such as the weight 52, for tensioning the belt. The rotatable objects R may be fed to both sides of the belt 75 as by suitable inclines 80 and 81. In this case the upper drums or rotatable objects will, by their own weight, cause the belt to assume a sinuous shape and conform closely to a portion of the circumference of both the upper series of drums R and the lower series, the lower series being in turn supported upon the generally horizontal or slightly inclined surface indicated at 82. Movement of the belt 75 in the direction of the arrow as shown in Fig. 8 will, therefore, similarly rotate the drums R and move them along the surface 82.

Operation

Referring specifically to Fig. 1, it may be noted that the height H (liquid head) will be a distance sufficient to maintain a suitable pressure and temperature upon the cans of foodstuffs to be cooked and sterilized. For example, for a temperature of 250° F. the height H will be of the order of thirty-five feet. Obviously, as the cans move downwardly in portion 11 and the rest of the system they are subjected to an increasing pressure or liquid head corresponding to the portion of the height H involved and as they move upwardly in portion 33 to a lesser and lesser pressure. The entire apparatus or conduit 10 is first filled with water as by utilizing the cold water inlet pipes 58, 59 and 60. Steam is then turned on in the steam headers 55 to heat the water so that a maximum temperature of 250° F. is achieved in the horizontal tube 21. If number two cans or slightly larger cans are to be processed, which have a diameter of 3 7/16 inches the transverse dimension of the conduit 10, including especially the vertical sections 11 and 33, should have a transverse dimension of about 6½ inches, i. e. from a quarter to half an inch less than twice the diameter of the cans to be treated. As indicated in Fig. 5 somewhat larger cans may also be treated by spacing these cans to a greater extent. Thereafter the supporting member 61a is assembled with the belt 40 and the belt slowly moved while feeding cans therein as indicated in Fig. 4, until the system is loaded with cans and the member 61a reaches the discharge tables 64 and 65. If the system is preheated and the proper conditions established during this movement the first cans may also be processed; or, in the alternative, the system may be loaded with dummy cans to start with and the proper conditions thereafter established. Depending on the type of food being processed, the speed of the belt 40 should be such that cans are moved through the system so that they are heated for approximately fifteen minutes at temperatures approaching 250° F. Thereafter, as they enter the tube 22, they are gradually cooled at lower and lower temperatures until they are discharged at approximately room temperature or slightly above. During the processing steam is fed into the headers 55 at a sufficient rate to maintain the proper temperatures and also to establish the current of hot water in countercurrent relation to the movement of the cans so that the hot water discharges at the outlet 54 at approximately 212° F. Similarly sufficient cold water should be fed through the header 57 and the other cold water inlets 59 and 60 to cool the cans down as they pass along the horizontal tube 22 and upwardly along the portion 33. It is to be noted that during the movement of the cans through the system they are constantly rotated so that the contents are given a certain amount of agitation and that further an efficient heat exchange is established since the cans are continuously suspended in hot water. Where it is desired to treat smaller cans, it is only necessary to decrease the dimension A of the modified upper portion 36, as shown in Fig. 2, as for example, to six inches. As may be understood the cans should be pressed more tightly against the belt when they are to be lifted in a vertical direction and it is unnecessary, even for processing of smaller cans, to change the transverse dimension of the horizontal tubes or the vertical descending portion 11. In Fig. 7 the dimension B corresponds to the critical dimension A of the modification first described.

I claim:

1. A process for canning food products in cans which comprises applying a driving force to the periphery of said cans to continuously roll said cans along a closed liquid filled path in a downward direction and under continuously increasing pressure of a liquid head, heating a portion of the liquid in said path to a temperature exceeding the boiling point of water at atmospheric pressure and below the boiling point of water at the respective liquid head of the liquid in said path to sterilize said cans and contents thereof, thereafter cooling the liquid in said path adjacent the point of maximum liquid head therein and thereafter reversing the direction of movement of said cans so that said cans are rolled in an upward direction and at a continuously decreasing liquid head.

2. The process of claim 1 wherein the liquid in said path is heated to a maximum temperature adjacent the point of maximum liquid head and flows in countercurrent direction to said cans.

3. The process of claim 1 wherein the liquid in said path is heated by the injection of steam thereinto.

4. A process for canning food products in cans which comprises applying a driving force to the periphery of said cans to continuously roll said cans along a closed liquid filled path in a downward direction and under continuously increasing pressure of a liquid head, heating a portion of the liquid in said path to a temperature exceeding the boiling point of water at atmospheric pressure and below the boiling point of water at the respective liquid head of the liquid in said path to sterilize said cans and contents thereof, by injecting a heating medium into the liquid in said path, the liquid in said path being heated to a maximum temperature at the point of maximum liquid head, flowing the liquid from the point adjacent the point of maximum liquid head countercurrently to the movement of cans in said path, cooling the liquid in said path by injecting a liquid cooling medium thereinto and flowing said cooling medium concurrently with the movement of said cans in said path, the movement of the cans during cooling being in a generally upward direction and at a continuously decreasing liquid head.

References Cited in the file of this patent

UNITED STATES PATENTS

| Number | Name | Date |
|---|---|---|
| 751,170 | Hopkins | Feb. 2, 1904 |
| 1,227,101 | Wehmiller | May 22, 1917 |
| 1,252,302 | Riesenecker | Jan. 1, 1918 |
| 1,584,397 | Paxton | May 11, 1926 |
| 1,596,606 | Fooks | Aug. 17, 1926 |
| 1,754,584 | Thompson | Apr. 15, 1930 |
| 2,286,250 | Albertoli | June 16, 1942 |
| 2,472,970 | Hanna | June 14, 1949 |
| 2,569,645 | Viall | Oct. 2, 1951 |